Dec. 9, 1952 T. H. KRUEGER 2,620,992

REMOVABLE TAPE HOLDING CRADLE

Filed Oct. 23, 1945 2 SHEETS—SHEET 1

INVENTOR
Theodore H. Krueger
BY
Moses, Nolte, Crews and Berry
ATTORNEYS

INVENTOR
Theodore H. Krueger
BY
Moses, Nolte, Crews & Berry
ATTORNEYS

Patented Dec. 9, 1952 2,620,992

UNITED STATES PATENT OFFICE 2,620,992

REMOVABLE TAPE HOLDING CRADLE

Theodore H. Krueger, Stratford, Conn., assignor to Better Packages Incorporated, a corporation of New York Application October 23, 1945, Serial No. 624,012

1 Claim. (Cl. 242—55.5)

This invention relates to tape holding cradles for dispensers for tacky or pressure sensitive adhesive tape.

In tape dispensers it is necessary as soon as one roll of tape is used up to replace it with a new roll, and in the case of dispensers for tacky or pressure sensitive tape much difficulty is experienced in threading the leading end of a new roll of tape through the parts of the machine so as to bring the tape into position for normal operation of the machine. Frequently the leading end of the tape has to be led through narrow spaces over one or more guide rollers, and this is sometimes a difficult operation, particularly with wide and very tacky tapes. It is very easy for the end of the tape to stick to the wrong part, or to become twisted or folded back upon itself, in which case it is impossible to straighten the tape out, and frequently considerable lengths at the end of the tape will have to be torn off and thrown away before the tape can be successfully positioned in the machine.

It is an object of the present invention to provide a tape cradle which can be removed from the machine so that the roll of tape can be properly positioned therein and the cradle and roll of tape then inserted as a unit into the dispenser. It is a particular object of the invention to provide such a cradle with an adhesion member, or members, thereon to which the leading end of the tape can be attached before the cradle and tape are inserted in the machine, such adhesion member, or members, holding the end of the tape properly positioned for insertion into the dispenser. In preferred embodiments of the invention the adhesion member takes the form of a guide roller, or rollers, which hold the end of the tape in position while it is being inserted in the dispenser and which also function as tape guiding means in connection with the normal operation of the dispenser. With such a construction the end of the tape is threaded over the guide rollers, while the cradle is removed from the dispenser, so that when the cradle and tape are returned to the dispenser the leading end of the tape is so positioned that the dispenser may be immediately put into operation.

In the accompanying drawings, which show preferred embodiments of the invention, Figure 1 is a side elevation of one form of dispenser with which the invention may be used, part of the side wall of the machine being broken away to show the removable tape cradle and its supporting means.

Figures 1, 2:
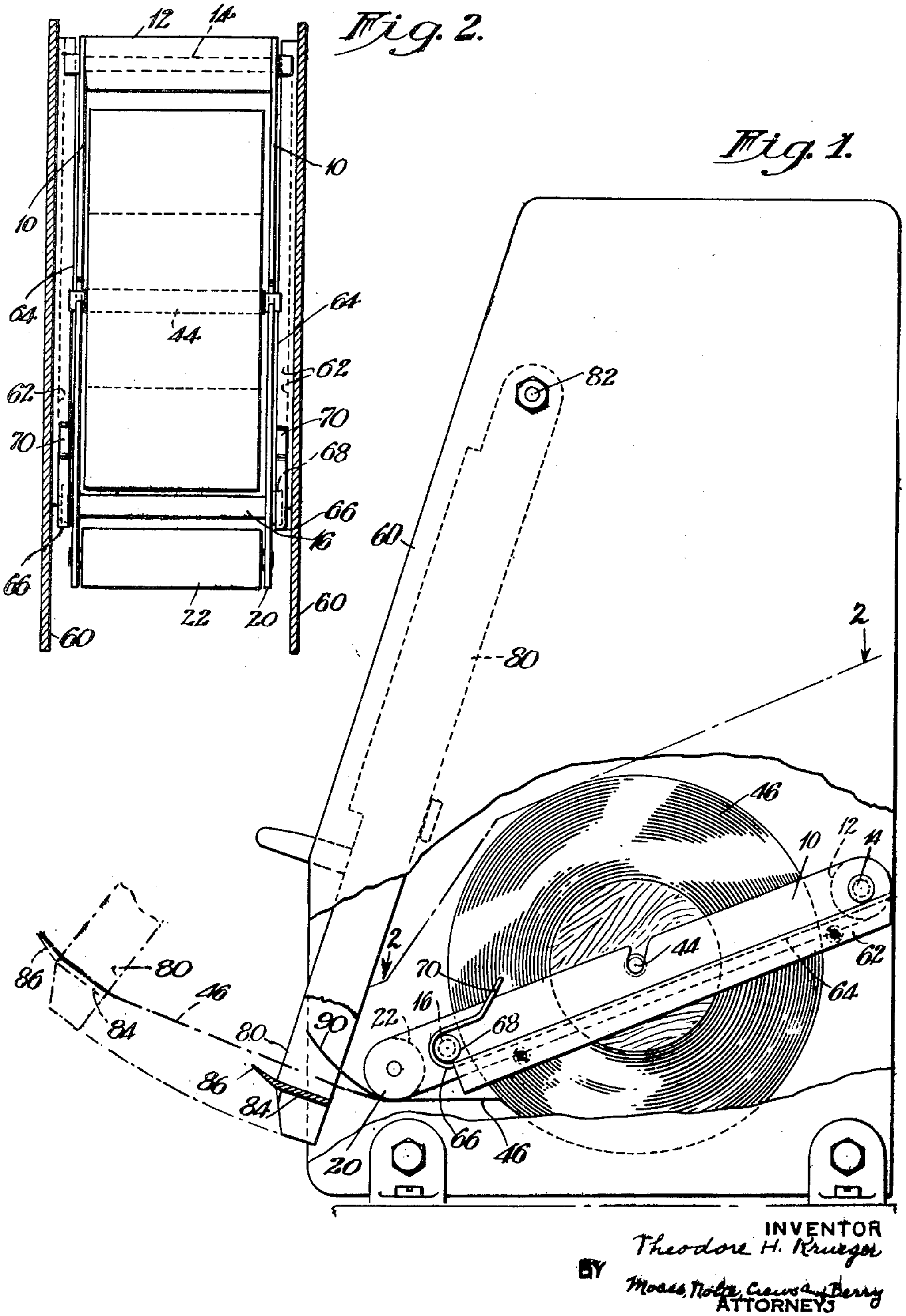
Figure 2 is a transverse section on line 2—2 of Figure 1.
Figure 3:
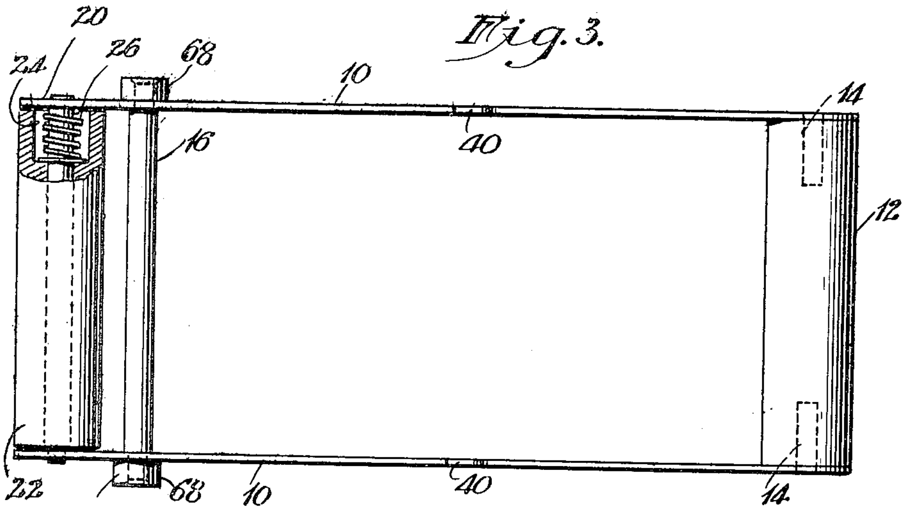
Figure 3 is a plan view of the cradle removed from the dispenser.
Figure 4:
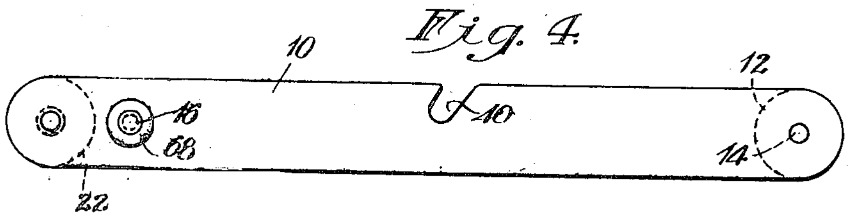
Figure 4 is a side elevation of the cradle.
Figure 5:
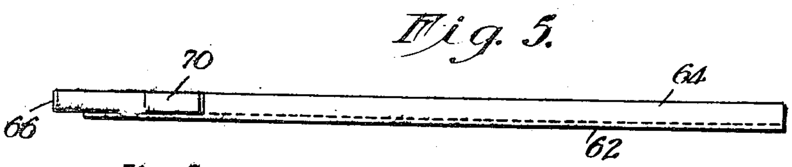
Figure 5 is a plan view of one of the cradle mounting strips.
Figure 6:
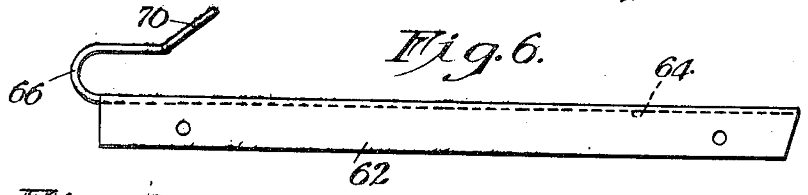
Figure 6 is a side elevation of the strip shown in Figure 5.
Figure 7:
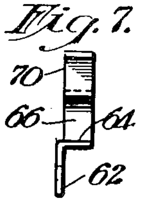
Figure 7 is an end view of the strip.

Referring to the drawings in detail, the tape holding cradle of the form shown in Figs. 1 to 4 comprises a pair of side bars 10, shown as connected at their rear ends by a spacing member 12 which, as illustrated, comprises a round bar of wood secured to the ends of the side frames by pins 14. Near their front ends the side bars are connected by a cross bar or bolt 16. Obviously the specific structure of the frame may be varied as desired. At the front end of the frame the side bars 10 project beyond the cross member 16, as indicated at 20, and journaled between such projecting ends 20 is a roller 22. This roller is preferably provided with means for preventing it from rotating too freely. As shown in Fig. 3 the roller has a recess 24 formed in its end in which is mounted a friction spring 26. The end of the spring bears against the inside of the projection 20 of the frame bar and applies a friction drag which, while permitting the roller to turn, resists free spinning.

Figure 8:
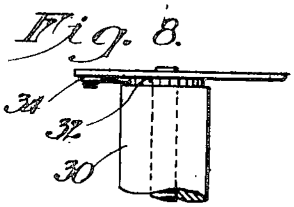
Fig. 8 is a detail view showing the end of a modified form of roller and part of the side bar of the cradle with the pawl and ratchet mechanism thereof.

Instead of using friction means to retard the rotation of the roller in some instances it is better to use a ratchet mechanism which will permit the roller to turn freely in one direction but will prevent it from turning in the other direction. Such an arrangement is shown in Fig. 8. As here shown the roller 30 has a ratchet 32 attached to its end which is engaged by a pawl 34, mounted on the side bar of the cradle.

The side bars of the cradle are provided with suitable means for rotatively supporting a roll of tape. In the form shown the bars are provided with inclined notches 40, which receive the ends of the shaft 42 of the tape spindle 44. Removably mounted on the tape spindle 44 is the roll of adhesive tape 46. When the roll of tape has been mounted in position the leading end of the tape is lifted from the roll and adhered to the adhesion member on the cradle, which in the present instance is the roller 22 or 30.

Figure 9:
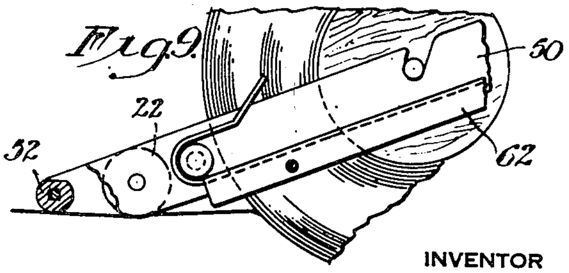
Fig. 9 is a side elevation of part of a modified form of cradle.

It will be understood that any suitable form of adhesion member may be used which may be fixed or rotatable, and which may consist of a single member or a plurality of members, depending upon the particular character of the dispenser with which the cradle is to be used. For example, Fig. 9 shows a cradle 50 having two adhesive members, a guide roller 22 and a non-rotatable bar 52. After the cradle has been placed in the machine the end of the tape is detached from the bar 52 and is guided in its path through the machine by the roller 22.

The cradle may be removably mounted in the machine in any suitable manner. In the example of Figs. 1 to 7 a machine is shown having a frame including side walls 60. Secured to the inner faces of the side walls are cradle mounting strips 62 having inwardly projecting flanges 64, terminating at their forward ends in reversely bent hooks 66. The cradle is slipped in from the rear of the machine which is open and is guided by the flanges 64. At the ends of the bolt or cross member 16 of the cradle are heads 68, which are received in the hooks 66, thus limiting the movement of the cradle. The tips of the hooks are preferably inclined or flared as indicated at 70, so as to assist in guiding the cradle into position. The strips 62 are preferably inclined downwardly and forwardly so that the cradle will retain its position by gravity.

The particular form of machine shown in Fig. 1 is an illustration of one type of machine to which the removable cradle of the present invention is applicable. The machine is provided with a feeding and measuring yoke or pendulum member comprising pendulum bars 80 pivoted at their upper ends on the pivot pin 82, mounted between the side walls of the machine frame. The bars are joined at their lower ends by a grasping table 84. For severing the tape there may be included a cutter, such as a serrated tear-off blade 86, mounted on the forward edge of the grasping table 84. Before inserting the tape cradle into the machine the end of the tape is drawn under the roller 22 and adhered thereto with the end of the tape projecting, as indicated at 90. When the tape cradle is inserted in the machine the projecting end 90 overlies the grasping table 84 so that it is in position to be grasped by the operator, who takes hold of the grasping table 84 and the end of the tape between his thumb and finger, and swings out the grasping table and pendulum arms 80, as shown in dotted lines in Fig. 1, withdrawing the desired length of tape. The non-adhesive side of the tape rests upon the surface of the grasping table. The tape is guided as it is drawn out by the roller 22. After the desired length of tape has been withdrawn the operator lets go of the grasping table and permits it to swing back to the full line position shown in Fig. 1, while the end of the tape remains adhered to his finger. He now pulls down the end of the tape so as to draw the tape across the serrated cutting edge and thus cuts or tears off the piece of tape dispensed. The cut end of the tape now again overlies the grasping table so that the machine is in position for another dispensing operation.

The particular form of machine illustrated is not claimed herein as it forms the subject matter of an application for patent filed by Theodore H. Krueger and Everett Sharpe, Serial Number 643,934 filed January 28, 1946, now Patent No. 2,530,335 dated November 14, 1950. As above stated the removable tape cradle may be used on other types of machines.

While I have illustrated and described in detail certain preferred forms of my invention, it is to be understood that changes may be made therein and the invention embodied in other structures. I do not, therefore desire to limit myself to the specific constructions illustrated, but intend to cover my invention broadly in whatever form its principle may be embodied.

I claim:

In combination, a tacky tape dispenser having inwardly projecting flanges downwardly and forwardly inclined and adapted to support a removable tape-holding cradle, a roll of tacky tape having a center member and a continuous strip of tacky tape wound thereon, a removable tape-holding cradle comprising a frame having side members and transverse members connected between the side members at their opposite ends thereof to hold the side members in spaced relationship for receiving the tacky tape roll, means for connecting the center member of the tacky tape roll to the side members of the frame for rotation with respect thereto, a transverse adhesion roll connected between corresponding ends of the side members to which the one end of the tacky tape may adhere and be guided, said tacky tape roll being journaled on the side members for rotation thereon and means cooperating between the roll and one of the side members to restrain rotational movement of the rotatable adhesion roll in a reverse direction, whereby upon said tacky tape adhering to the adhesive roll prevents the reverse rotation and the release of said tacky tape roll.

THEODORE H. KRUEGER.

REFERENCES CITED

The following references are of record in the file of this patent:

UNITED STATES PATENTS

| Number | Name | Date |
|---|---|---|
| 1,225,363 | Sabin | May 8, 1917 |
| 1,815,785 | Leimburger | July 21, 1931 |
| 1,837,418 | Elder | Dec. 22, 1931 |
| 1,924,088 | Bowles et al. | Aug. 29, 1933 |
| 1,975,792 | Katz | Oct. 9, 1934 |
| 2,324,796 | Neptune | July 20, 1943 |
| 2,366,971 | Krueger | Jan. 9, 1945 |
| 2,519,701 | Richardson | Aug. 22, 1950 |
| 2,536,066 | Krueger | Jan. 2, 1951 |